(12) United States Patent
Kaneda et al.

(10) Patent No.: US 10,427,449 B2
(45) Date of Patent: Oct. 1, 2019

(54) WRITING INSTRUMENT AND ELECTRONIC PEN BODY SECTION

(71) Applicant: Wacom Co., Ltd., Saitama (JP)

(72) Inventors: Takenori Kaneda, Tochigi (JP); Kenichi Ninomiya, Kanagawa (JP); Hiroyuki Fujitsuka, Saitama (JP); Kohei Tanaka, Tokyo (JP)

(73) Assignee: WACOM CO., LTD., Saitama (JP)

( * ) Notice: Subject to any disclaimer, the term of this patent is extended or adjusted under 35 U.S.C. 154(b) by 58 days.

(21) Appl. No.: 15/608,406

(22) Filed: May 30, 2017

(65) Prior Publication Data

US 2017/0361639 A1 Dec. 21, 2017

(30) Foreign Application Priority Data

Jun. 16, 2016 (JP) .................. 2016-119450

(51) Int. Cl.
*B43K 5/02* (2006.01)
*B43K 27/00* (2006.01)
*G06F 3/0354* (2013.01)
*B43K 27/08* (2006.01)
*G06F 3/044* (2006.01)
*G06F 3/046* (2006.01)

(52) U.S. Cl.
CPC ............. *B43K 27/006* (2013.01); *B43K 5/02* (2013.01); *B43K 27/08* (2013.01); *G06F 3/03545* (2013.01); *B43K 27/00* (2013.01); *G06F 3/044* (2013.01); *G06F 3/046* (2013.01)

(58) Field of Classification Search
CPC ...... B43K 27/006; B43K 27/08; B43K 27/00; B43K 5/02; G06F 3/03545; G06F 3/044; G06F 3/046
See application file for complete search history.

(56) References Cited

U.S. PATENT DOCUMENTS

| 2,624,314 | A | | 1/1953 | Spatz | |
| 3,225,747 | A | * | 12/1965 | Schmidt | B43K 24/166 401/112 |
| 4,158,747 | A | | 6/1979 | Muller et al. | |
| 4,382,706 | A | * | 5/1983 | Hashimoto | B43K 21/027 401/116 |

(Continued)

FOREIGN PATENT DOCUMENTS

| JP | 5-275283 A | 10/1993 |
| JP | 7-44304 A | 2/1995 |

(Continued)

*Primary Examiner* — Wing H Chow
(74) *Attorney, Agent, or Firm* — Seed IP Law Group LLP

(57) ABSTRACT

A writing instrument includes a cylindrical outer housing, one end of the outer housing having an outer opening, and an electronic pen body stored in the outer housing. The electronic pen body includes a stylus, one end of the stylus in an axial direction of the stylus serving as a pen tip, and a cylindrical inner housing storing the stylus, the one end of the stylus serving as the pen tip extending from an inner opening at a distal end of the inner housing, the inner opening of the inner housing defining one axial end of a hole extending axially forming a stylus guide that enables the stylus to move axially. In operation, the pen tip of the stylus and a distal portion of the inner housing having the inner opening extend from the outer opening of the outer housing.

19 Claims, 9 Drawing Sheets

(56) References Cited

U.S. PATENT DOCUMENTS

| | | | |
|---|---|---|---|
| 4,532,376 A * | 7/1985 | Rockwell | H01H 13/50 178/19.01 |
| 8,913,041 B2 | 12/2014 | Fukushima et al. | |
| 9,063,025 B2 | 6/2015 | Horie et al. | |
| 2012/0086664 A1* | 4/2012 | Leto | B43K 7/005 345/174 |
| 2015/0247743 A1 | 9/2015 | Horie et al. | |
| 2016/0062490 A1 | 3/2016 | Ogata et al. | |
| 2017/0090605 A1 | 3/2017 | Horie et al. | |

FOREIGN PATENT DOCUMENTS

| | | |
|---|---|---|
| JP | 7-295722 A | 11/1995 |
| JP | 2011-186803 A | 9/2011 |
| JP | 2013-161307 A | 8/2013 |
| WO | 2016/031329 A1 | 3/2016 |

* cited by examiner

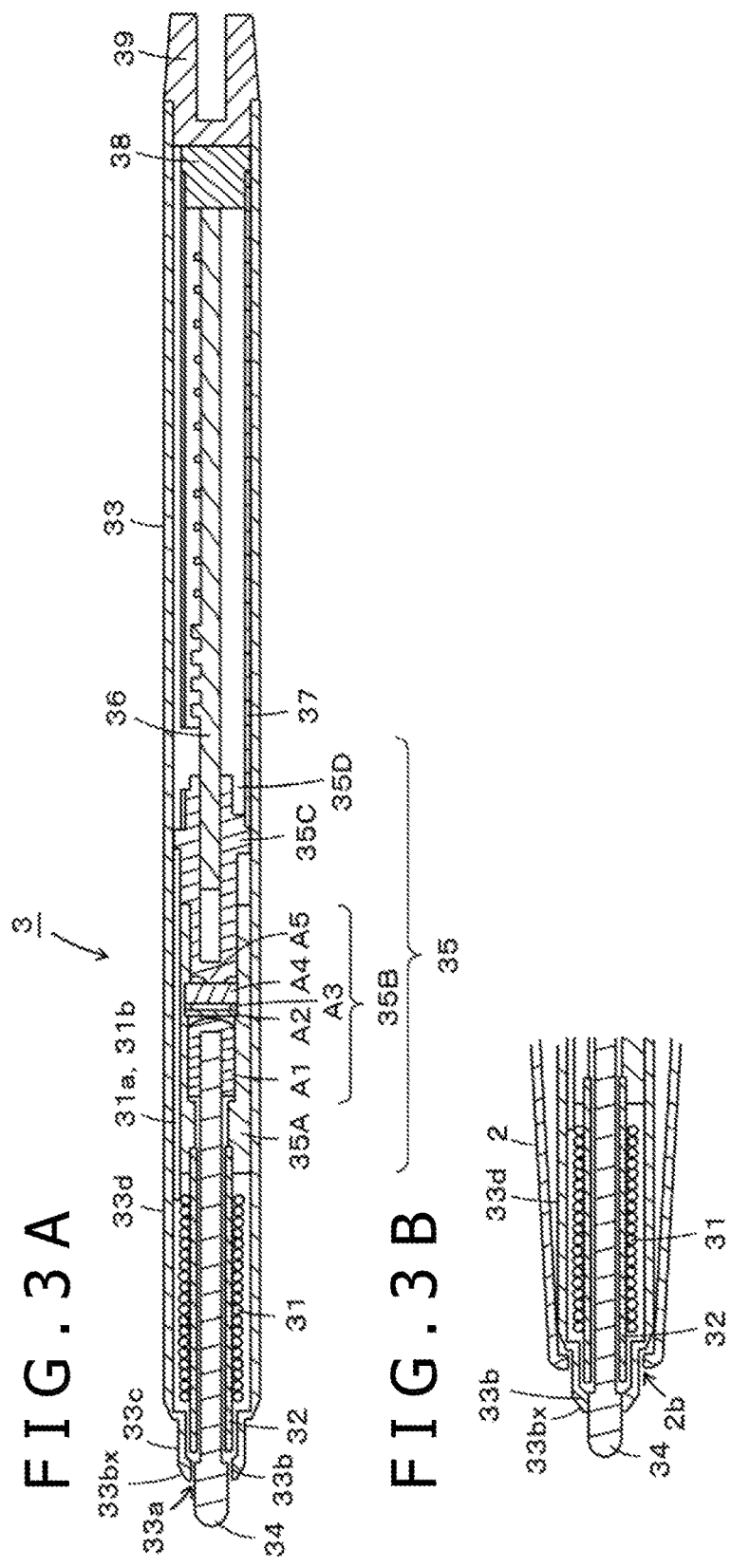

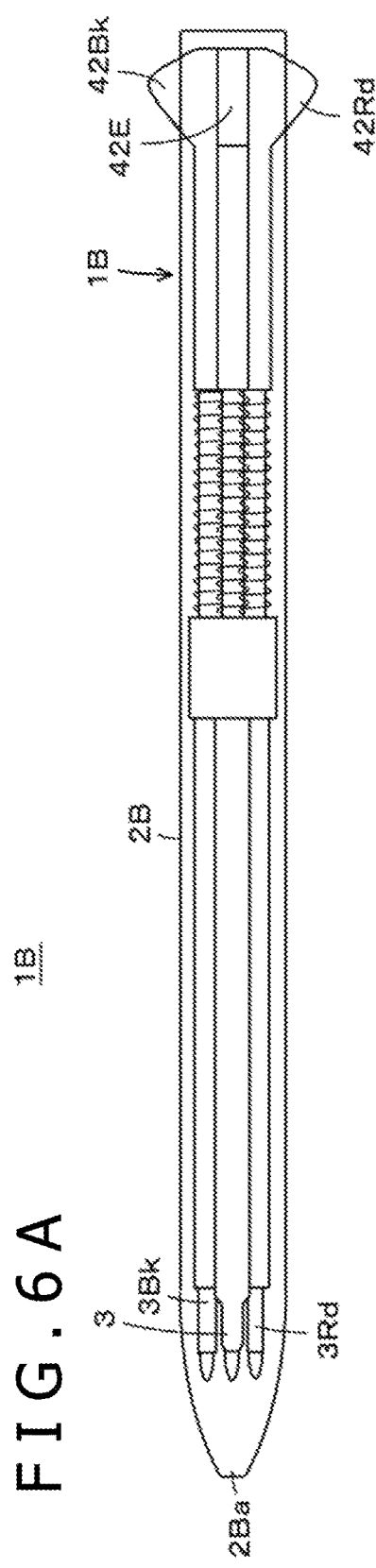
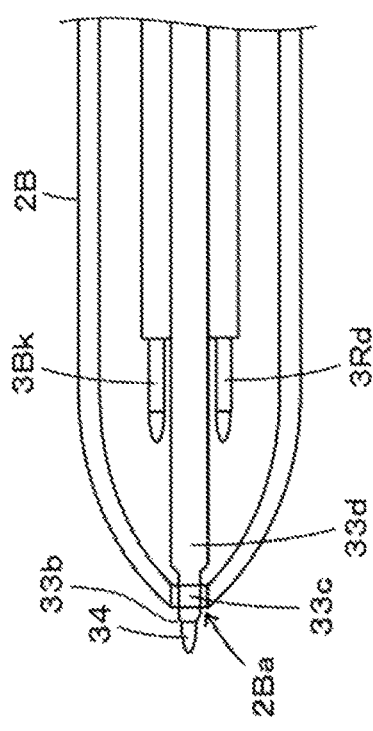
FIG. 6A
FIG. 6B

WRITING INSTRUMENT AND ELECTRONIC PEN BODY SECTION

BACKGROUND

1. Technical Field

The present disclosure relates to a writing instrument and an electronic pen body section, the writing instrument having an electronic pen function and serving as a position indicator indicating a position to a sensor, the electronic pen body section implementing the electronic pen function.

2. Description of Related Art

There have been marketed numerous information terminals each furnished with a touch panel, such as high-performance mobile phones called smartphones as well as tablet personal computers (PCs). The touch panel is an electronic component that combines a display device such as a liquid crystal display with a position detecting circuit using a sensor (coordinate detecting sensor). When touched by fingertips of a user, for example, the touch panel permits diverse input operations. Where it is necessary to perform more detailed input operations, an electronic pen is used as the position indicator.

A device known as a digitizer is widely used as an input device for the personal computer. The digitizer is made up of a board that incorporates a sensor for detecting positions and an electronic pen for designating the positions. The digitizer is designed primarily to make detailed input operations using the electronic pen.

As is well known, the electronic pen is held by a user's hand and used to designate positions on the sensor. A position on the sensor is designated using the electronic pen in accordance with any one of diverse methods such as the electromagnetic induction method or the capacitive coupling method. Based on one of these methods, a position detecting signal is exchanged between the electronic pen and the sensor so that a position detecting device incorporating the sensor detects the designated position. Japanese Patent Laid-Open No. 1995-044304, to be described later, discloses a typical input device constituted by a coordinate detecting sensor and an electronic pen operated by the electromagnetic induction method. Japanese Patent Laid-Open No. 1995-295722, also to be described later, discloses another typical input device made up of a coordinate detecting sensor and an electronic pen operated by the capacitive coupling method.

Regardless of being operated by the electromagnetic induction method or by the capacitive coupling method, the electronic pen is configured to have a circuit board, among others. The existing electronic pen is thus typically larger than common writing instruments such as ballpoint pens or fountain pens. However, from the user's point of view, there exists a need for an electronic pen to be just as short and as thin as a so-called cartridge or a refill used in the ballpoint pen so that the electronic pen may be placed inside the housing of a familiar ballpoint pen for use.

There have been marketed multicolor ballpoint pens such as two-color or three-color ballpoint pens, as well as multifunctional pens allowing a choice of either a cartridge providing the function of a mechanical pencil or a refill serving as a ballpoint pen. Thus there is a need for a writing instrument that serves as an electronic pen replacing the refill (cartridge) of a multicolor ballpoint pen or implements one of the functions of a multifunctional pen. A multifunctional pen that includes the electronic pen function, if implemented, is convenient because it eliminates the need for carrying around an electronic pen and other writing instruments separately.

Recent years have witnessed a growing trend in which electronic pens have capacitors and other parts on their internal circuit board replaced by an electronic chip and have a writing pressure detector made smaller so that the electronic pens are formed to be thinner than ever. Today, the electronic pen may be just as short and as thin as a ballpoint pen refill, for example. Also formed to be smaller in this configuration is a stylus which constitutes a member of the electronic pen and of which one end serves as a pen tip, as well as a magnetic material core that is another member of the electronic pen located near the stylus.

The electronic pen body section (electronic pen cartridge) made as thin as a ballpoint pen refill is typically disposed inside the housing of a writing instrument such as a ballpoint pen. In operation, the pen tip-side part made of a stylus tip is extended from an opening at one end of the writing instrument housing. In this case, the stylus making up the pen tip-side part is formed to be so thin as mentioned above such that when the pen tip-side part is extended, the stylus may conceivably be vulnerable to external force such as vertical or horizontal impact that may be applied to the pen tip.

The so-called multifunctional pen that stores the function of a ballpoint pen and that of an electronic pen in a single housing typically has a rotary or knock type pen tip extending mechanism. When used, the multifunctional pen has the pen tip-side part of a ballpoint pen or an electronic pen extended from the housing by the extending mechanism. When not used, the multifunctional pen has the pen tip-side part retracted into the housing. There may be problems with this type of multifunctional pen. That is, when the pen tip-side part of the ballpoint pen or the electronic pen is extended from or retracted into the housing of the multifunctional pen equipped with the rotary or knock type pen tip extending mechanism, the cartridge inside generally moves obliquely toward the opening at the end of the housing and extended therefrom. At this point, the pen tip-side part of the ballpoint pen or the electronic pen comes into contact with the surroundings of the housing opening.

Where the pen tip-side part of the electronic pen frequently comes into contact with the inner circumference of the housing opening, there is fear that the pen tip-side part may be damaged or deformed. When the stylus that slides axially in keeping with writing pressure so as to detect the writing pressure is constantly in contact with the housing of the writing instrument, there is fear that the stylus may not slide appropriately in keeping with the writing pressure. This can result in incorrect detection of the writing pressure.

BRIEF SUMMARY

The present disclosure has been made in view of the above circumstances. It is therefore an object of the disclosure to provide a writing instrument having an electronic pen function and an electronic pen body implementing the electronic pen function, the electronic pen body section having a pen tip-side portion formed to be thin without incurring the above-mentioned problems. For example, the writing instrument performs an electronic pen function by indicating a position of a stylus included in the writing instrument based on electromagnetic induction or capacitive coupling.

The term "writing instruments" usually refers to tools typified by pencils, ballpoint pens, and fountain pens that are held by a person's hand to write characters, symbols, drawings, and pictures directly onto a recording medium such as sheets of paper. In this specification, however, the term "writing instruments" refers to tools including the so-called electronic pen held by a person's hand to input characters, symbols, drawings, and pictures, as well as instructions to an information processing device by way of an input device such as a touch panel or a digitizer.

In solving the problems above and according to one embodiment of the present disclosure, there is provided a writing instrument including a cylindrical outer housing, one end of the outer housing having an outer opening, and an electronic pen body stored in the outer housing. The electronic pen body includes a stylus, one end of the stylus in an axial direction of the stylus serving as a pen tip, and a cylindrical inner housing storing the stylus, the one end of the stylus serving as the pen tip extending from an inner opening at a distal end of the inner housing, the inner opening of the inner housing defining one axial end of a hole extending axially forming a stylus guide that enables the stylus to move axially. In operation, the pen tip of the stylus and a distal portion of the inner housing having the inner opening extend from the outer opening of the outer housing.

The above-outlined writing instrument according to the present disclosure has an electronic pen body stored in a cylindrical outer housing, one end of the housing having an outer opening. The electronic pen body includes a stylus, one end of the stylus in the axial direction of the stylus includes a pen tip. The stylus is stored inside a cylindrical inner housing, with a pen tip of the stylus extending from an inner opening at a distal end of the inner housing. In operation, the pen tip of the stylus and a distal portion of the inner housing both extend from the outer opening of the outer housing.

With the above configuration, the portion of the stylus excluding its pen tip is held inside the inner housing and not exposed for protection of the stylus against external force such as vertical or horizontal impact that may be applied to the pen tip. In the case of a multifunctional pen, when the stylus held inside the inner housing is moved obliquely toward the outer opening of the outer housing and extends therefrom, the stylus does not come into direct contact with the inner circumference of the outer opening of the outer housing. Thus in the case of a writing instrument having the electronic pen body extending from the outer housing upon use and retracted into the outer housing during non-use, the stylus is also protected securely against damage or deformation. In operation, the distal of the inner housing is in contact with the surroundings of the outer opening of the outer housing, with the stylus itself kept from contacting the surroundings of the outer opening of the outer housing. This permits suitable detection of the writing pressure applied to the stylus.

According to the present disclosure, a thinly formed distal portion of the electronic pen body that performs an electronic pen function is protected against damage or deformation during use. In the case of a multifunctional pen having a pen tip moved obliquely toward an outer opening at one end of an outer housing and extending therefrom, a stylus at the distal portion of the electronic pen body that performs an electronic pen function does not get caught by the surroundings of the outer opening. This provides a writing instrument in which the stylus is well protected against damage. It is also possible to provide a writing instrument having an electronic pen function that is capable of suitably detecting a writing pressure applied to a stylus.

BRIEF DESCRIPTION OF THE DRAWINGS

FIGS. 3A and 3B are schematic views of an example of a configuration of an electronic pen body according to one or more embodiments of the present disclosure, and an example of a configuration of a distal portion of a writing instrument accommodating the electronic pen body;

FIGS. 6A and 6B are schematic views of an example in which the electronic pen body is used in a knock type multifunctional pen;

DETAILED DESCRIPTION

Some preferred embodiments of a writing instrument and an electronic pen body section according to the present disclosure are described below with reference to the accompanying drawings.
(Example Configuration of Knock Type Writing Instrument)

Figure 1A:
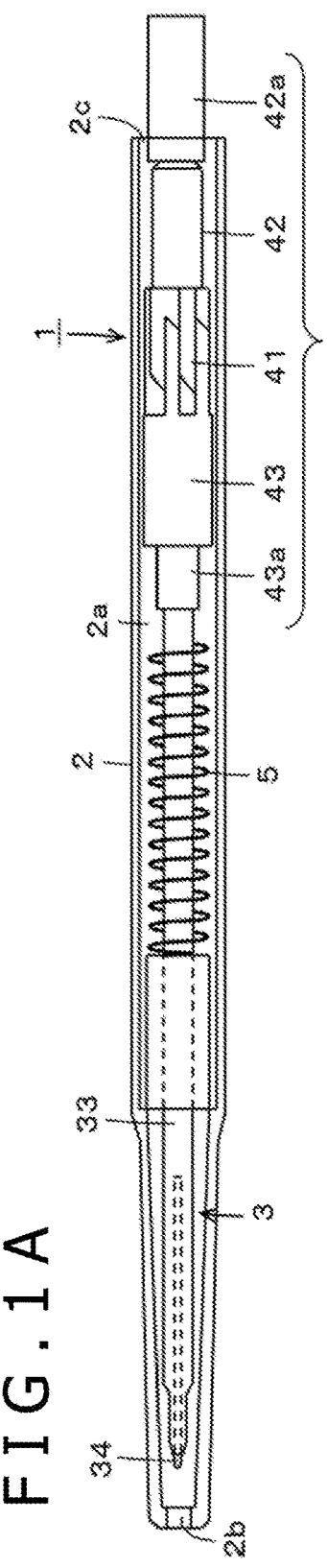
FIGS. 1A and 1B are schematic views showing an example of a configuration of a writing instrument and an electronic pen body according to one or more embodiments of the present disclosure.
Figure 1B:
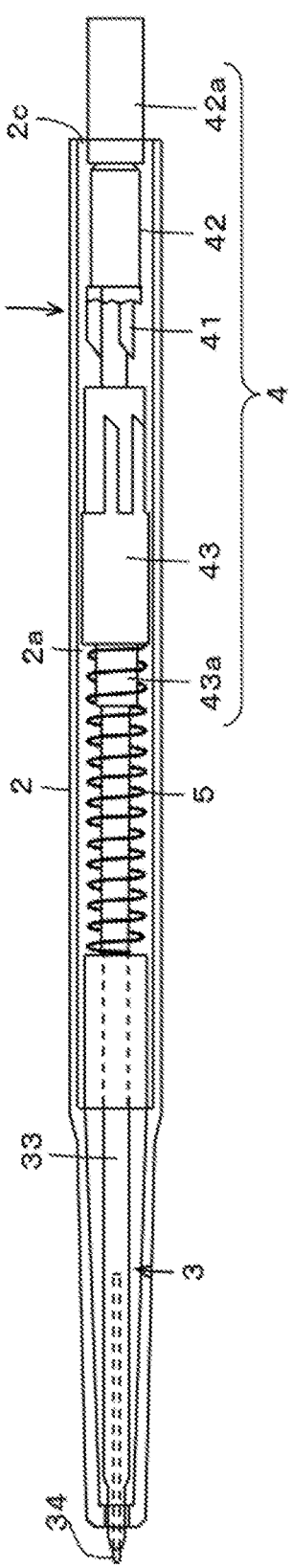

Described first is an embodiment of the present disclosure applied to an electronic pen operated by an electromagnetic induction method constituting a knock type writing instrument. FIGS. 1A and 1B are schematic views showing an example of a configuration of a writing instrument and an electronic pen body according to one or more embodiments of the present disclosure. A writing instrument 1 of the present embodiment implements an electronic pen function. An electronic pen body section 3 is stored inside a hollow part 2a of a cylindrical housing (outer housing of the writing instrument) 2. A knock cam mechanical part 4 is provided to extend and retract the pen tip side of the electronic pen body section 3 through an opening 2b at one longitudinal end of the outer housing 2 in what may be called a knock type configuration. In the present embodiment, the electronic pen body section 3 has a cartridge type structure stored removably in the outer housing 2.

FIG. 1A shows the entire electronic pen body section 3 as it is stored in the hollow part 2a of the outer housing 2. FIG. 1B shows the pen tip side of the electronic pen body section 3 as it is extended by the knock cam mechanical part 4 from the opening 2b of the outer housing 2. In the example of FIGS. 1A and 1B, the outer housing 2 of the writing instrument 1 is made of a transparent synthetic resin through which the inside of the writing instrument 1 can be seen. The writing instrument 1 of the present embodiment is configured to be interchangeable with a commercially available knock type ballpoint pen.

The outer housing 2 and the knock cam mechanical part 4 disposed therein have substantially the same structures and sizes as those of commercially available knock type ballpoint pens. In other words, the outer housing 2 and the knock cam mechanical part 4 of a commercially available knock type ballpoint pen may be appropriately unmodified for the present embodiment.

As shown in FIGS. 1A and 1B, the knock cam mechanical part 4 has a known configuration combining a cam body 41, a knocking rod 42, and a rotator 43. The cam body 41 is formed on the inner wall of the cylindrical housing 2. The knocking rod 42 has an end part 42a extended from an opening 2c of the outer housing 2 opposite the pen tip side, allowing the user to knock on the end part 42a. The rotator 43 has an interlocking part 43a to be interlocked with the end part of the electronic pen body section 3 opposite the pen tip side.

Knocking on the end part 42a of the knocking rod 42 in the state of FIG. 1A causes the knock cam mechanical part 4 to lock the electronic pen body section 3 into the state of FIG. 1B inside the outer housing 2, with the pen tip side of the electronic pen body section 3 extended from the opening 2b of the outer housing 2. Again knocking on the end part 42a of the knocking rod 42 in the state of FIG. 1B causes the knock cam mechanical part 4 to unlock the locked state, allowing a return spring 5 to bring the electronic pen body section 3 inside the outer housing 2 back to the position in the state of FIG. 1A. The detailed structures and operations of the knock cam mechanical part 4 are well known and thus will not be discussed further.

(Example Configuration of Electronic Pen Body Section 3)

Figure 2A:
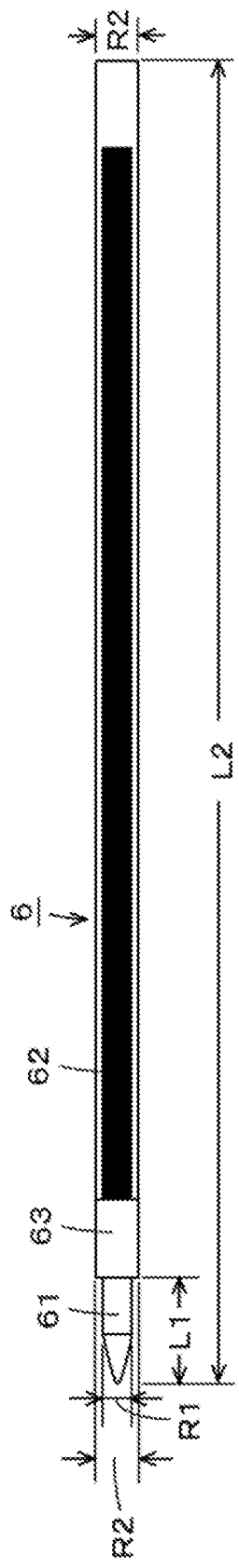
FIGS. 2A and 2B are schematic views of an appearance of an electronic pen body according to one or more embodiments of the present disclosure.
Figure 2B:
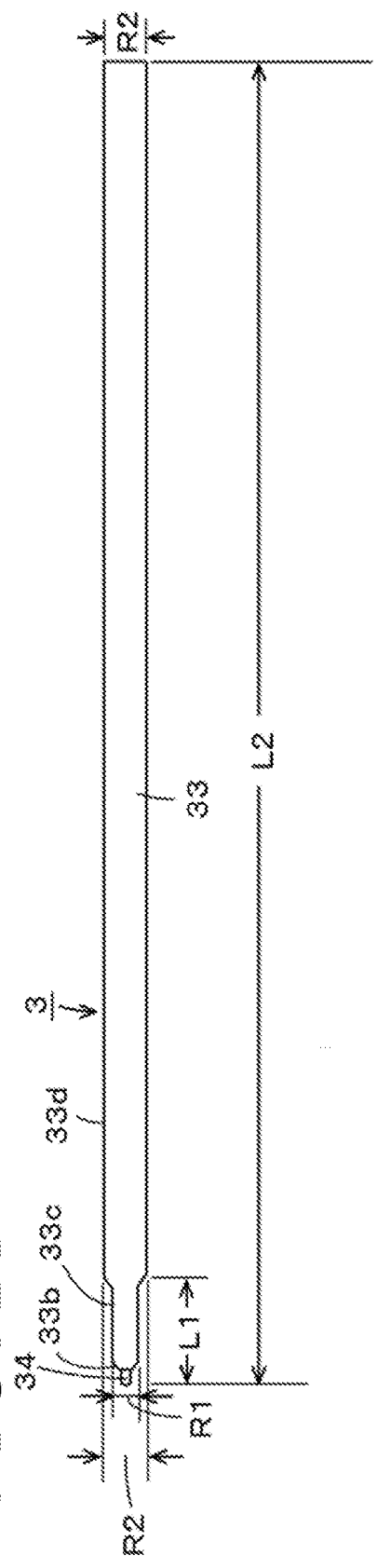

FIGS. 2A and 2B show an example of an appearance of the electronic pen body section 3 in comparison with a refill (cartridge) of a commercially available knock type ballpoint pen. Specifically, FIG. 2A shows a refill 6 of the commercially available knock type ballpoint pen, and FIG. 2B indicates a typical configuration of the electronic pen body section 3 of the present embodiment.

As shown in FIG. 2A, the refill 6 of the commercially available knock type ballpoint pen has a known configuration having a ball-tipped pen tip part 61 and an ink storage part 62 coupled with each other integrally by a coupling part 63. The coupling part 63 has the same diameter as the ink storage part 62.

Meanwhile, various members including a stylus 34 are mounted in a cylindrical housing (inner housing) 33 of the electronic pen body section 3 of the present embodiment, as shown in FIG. 2B. The stylus 34 has one end part thereof extended from an opening at one end part of the inner housing 33, as depicted in FIG. 2B. The end part of the stylus 34 extended from the inner housing 33 functions as the pen tip.

Also as shown in FIG. 2B, the inner housing 33 is made up of three parts: a part ranging from the pen tip side to a stylus guide part 33b, a ferrite storage part 33c, and a body storage part 33d. An outer tip part 33bx (FIGS. 3A and 3B) of the stylus guide part 33b is tapered. The ferrite storage part 33c stores a portion of the pen tip side of a ferrite core constituting a magnetic material core, as will be discussed later in more detail. The body storage part 33d stores the parts other than the above-mentioned portion of the pen tip side of the ferrite core, a writing pressure detector, and a printed board (circuit board).

As shown in FIGS. 2A and 2B, the pen tip side of the electronic pen body section 3 is configured to have approximately the same dimensions as those of the pen tip side of the ballpoint pen refill 6. Specifically, the ferrite storage part 33c on the pen tip side of the electronic pen body section 3 has approximately the same diameter as a diameter R1 of the pen tip part 61 of the ballpoint pen refill 6. The length from the pen tip-side end of the body storage part 33d to the pen tip of the stylus 34 is approximately the same as a length L1 of the pen tip part 61 of the ballpoint pen refill 6.

The body storage part 33d of the electronic pen body section 3 has approximately the same diameter as a diameter R2 of the ink storage part 62 of the ballpoint pen refill 6. The diameter of the body storage part 33d is larger than the diameter R1 of the pen tip part R1 (R2>R1). The opening 2b of the outer housing 2 shown in FIG. 1A has a diameter smaller than the diameter R2. That means the electronic pen body section 3 will not be extended from the opening 2b. The length from the tip of the stylus 34 to the end of the body storage part 33d opposite the pen tip side, i.e., the total length of the electronic pen body section 3, is arranged to be the same as a total length L2 of the ball point pen refill 6.

Described below is an example of an internal configuration of the electronic pen body section 3. FIGS. 3A and 3B are schematic views of an example of an internal configuration of the electronic pen body section 3 as a first embodiment of the present disclosure, and an example of a configuration of the pen tip side of the writing instrument 1 formed using the electronic pen body section 3.

As shown in FIG. 3A, the inner housing 33 made up of the stylus guide part 33b, the ferrite storage part 33c, and the body storage part 33d accommodates diverse members for implementing the electronic pen function. A ferrite core 32 is a cylindrical ferrite material having an axial through hole formed in a position that includes an axial center line (i.e., center axis), the through hole having a predetermined diameter (e.g., 1 mm across). The through hole allows the rod-like stylus 34 typically made of a resin to be inserted therethrough.

The stylus 34 is inserted in the through hole of the ferrite core 32 in a manner penetrating the ferrite core 32. That is, the stylus 34 is axially longer than the ferrite core 32. The portion of the stylus 34 inserted in the through hole of the ferrite core 32 has a slightly smaller diameter than the diameter of the through hole, so that the inserted portion of the stylus 34 slides axially inside the through hole. The end part of the stylus 34 serving as the pen tip has a diameter larger than that of the through hole of the ferrite core 32. The stylus end part is machined to have a hemispherical shape for smooth movement over an operation surface of a device such as a touch panel.

As shown in FIG. 3A, a portion of a predetermined axial length of the ferrite core 32 constitutes a coil wound part around which a coil 31 is wound. Both ends of the coil wound part are devoid of the coil windings. That is, when the ferrite core 32 is axially viewed, the portion from the pen tip-side end to one end of the coil wound part makes up a first coil unwound part, and the portion from the other end of the coil wound part to the other end part of the ferrite core 32 opposite the pen tip side makes up a second coil unwound part, the first and the second parts being devoid of the coil 31 windings.

Extension lines (conductor lines) 31a and 31b from the ends of the coil 31 wound around the ferrite core 32 extend inside the inner housing 33 up to a printed board 36. The extension lines 31a and 31b are thus connected to capacitors mounted on the printed board 36. The coil 31 and the capacitors on the printed board 36 are configured to make up a resonant circuit. This resonant circuit is coupled with the position detecting device by electromagnetic induction for signal exchange therebetween.

On the side of the stylus 34 opposite the pen tip is a connection part 35 composed of a mold part 35A, a writing pressure detector 35B, an interlocking part 35C, and a connection terminal part 35D. The connection part 35 integrally connects two portions: a portion made of the coil 31, the ferrite core 32, and the stylus 34; and a portion formed by the printed board 36 and a board protecting pipe 37. On the end face of the mold part 35A opposite the ferrite core 32 is a recessed part to be interlocked with the second coil unwound part of the ferrite core 32.

Further inside the mold part 35A, as shown in FIG. 3A, are a stylus holding part A1, a conductive rubber A2, a ring spacer A3, a dielectric body A4, and a terminal member A5. These parts are sandwiched between the mold part 35A and the interlocking part 35C to make up the writing pressure detector 35B for detecting writing pressure.

More specifically, the stylus holding part A1 is formed typically with hard rubber into a cup-like shape. The end part of the stylus 34 opposite the pen tip is inserted in and held by the stylus holding part A1. A bottom of the stylus holding part A1 opposite the stylus 34 is formed to be spherical. The stylus holding part A1 functions as a pushing part pushing the conductive rubber A2 in keeping with the writing pressure applied to the stylus 34.

The ring spacer A3 is a ring-shaped member positioned between the conductive rubber A2 and a pen tip-side face of the dielectric body A4, dissociating (separating) the two members by as much as the thickness of the ring spacer A3. The terminal member A5 having a predetermined area is pasted onto another face of the dielectric body A4. The conductive rubber (first electrode) A2 and the terminal member (second electrode) A5 have the dielectric body A4 sandwiched therebetween to constitute a variable capacitance capacitor.

The stylus 34 axially slides up and down in accordance with the writing pressure applied to the pen tip of the stylus 34. In a linked manner with the sliding movement, the stylus holding part A1 pushes the conductive rubber A2 up and down. The ring spacer A3 providing a space between the conductive rubber A2 and the dielectric body A4 allows the conductive rubber A2 to approach and come into contact with the dielectric body A4 in accordance with the writing pressure applied to the stylus 34, varying the contact area therebetween. This in turn varies the capacitance between the conductive rubber A2 and the terminal member A5 having the dielectric body A4 sandwiched therebetween. When no writing pressure is applied, the conductive rubber A2 is separated from the dielectric body A4 by the presence of the ring spacer A3.

A conductive line connected with the conductive rubber A2 and a conductive line connected with the terminal member A5 typically pass outside the mold part 35A and interlocking part 35C to connect with terminals of the connection terminal part 35D. In turn, the terminals of the connection terminal part 35D are connected to electronic circuits on the printed board 36. The connection allows the electronic circuits of the printed board 36 to detect the writing pressure applied to the stylus 34 in terms of the change in the capacitance of the variable capacitance capacitor formed as described above.

In this example, the writing pressure detector 35B made of the stylus holding part A1, the conductive rubber A2, the ring spacer A3, the dielectric body A4, and the terminal member A5 is substantially the same as a known writing pressure detecting measure of which the configuration is disclosed by Japanese Patent Laid-Open No. 1993-275283. Alternatively, the writing pressure detector 35B may be configured in substantially the same manner as a known writing pressure detecting measure disclosed by Japanese Patent Laid-Open No. 2011-186803. As another alternative, the writing pressure detector 35B may be configured to use a semiconductor device with its capacitance varied in keeping with a writing pressure detector as disclosed by Japanese Patent Laid-Open No. 2013-161307.

The interlocking part 35C is interlocked with the board protecting pipe 37. The interlocking part 35C is typically formed in a cylindrical shape using a resin or hard rubber, and is solidly interlocked integrally with the mold part 35A. As described above, the mold part 35A and the interlocking part 35C have the stylus holding part A1, the conductive rubber A2, the ring spacer A3, the dielectric body A4, and the terminal member A5 sandwiched therebetween to make up the writing pressure detector 35B that is held stably inside the inner housing 33.

Inside the interlocking part 35C is a recessed part to be interlocked with the tip part of the printed board 36. The connection terminal part 35D is made up of an upper plate and a lower plate coupled with the interlocking part 35C as shown in FIG. 3A. These plates are arranged to sandwich the printed board 36 therebetween.

One of the two plates, e.g., the upper plate in FIG. 3A, has terminals connected with the conductive lines coming from the conductive rubber A2 and the terminal member A5 as described above. When the printed board 36 is inserted into the connection terminal part 35D, the terminals are automatically connected to the terminal part of the electronic circuits on the printed board 36.

The printed board 36 has an insulated substrate mounted with various circuit components including an integrated circuit (IC) serving as a control circuit and multiple capacitors, all connected with one another. As shown in FIG. 3A, the printed board 36 is stored in and protected by the board protecting pipe 37.

The board protecting pipe 37 is formed typically with a metal, a carbonaceous material, or a synthetic resin to constitute a hardened tubular member resistant to breaking or bending force. The interlocking part 35C of the connection part 35 is inserted through the opening on the stylus side into a predetermined portion inside the board protecting pipe 37 so that the two parts are interlocked with each other. Likewise, a pipe cap 38 is inserted through the rear end-side opening into a predetermined portion inside the board protecting pipe 37 so that the two parts are interlocked with each other.

In this manner, the major components performing the function of the electronic pen body section 3 are constituted by four integrally interconnected parts: the pen tip side having the stylus 34 inserted in the ferrite core 32 wound with the coil 31, the connection part 35, the board protecting pipe 37 accommodating the printed board 36, and the pipe cap 38. The major components are stored in the inner housing 33 as shown in FIG. 2A. The rear end-side opening is interlocked with a connection member 39 connecting the electronic pen body section 3 into the outer housing. This is how the electronic pen body section 3 is configured.

The connection member 39 at the rear end of the electronic pen body section 3 configured as described above is interlocked with the interlocking part 43a of the rotator 43 in the knock cam mechanical part 4. This enables the electronic pen body section 3 to be stored in the outer housing 2. When the user uses the electronic pen 1 of the present embodiment in combination with the position detecting device, the user knocks on the end part 42a of the knocking rod 42. The knocking action on the electronic pen 1 causes the pen tip at the end of the stylus 34 and the tip side of the inner housing 33 to be extended from the outer housing 2, as shown in FIG. 1B.

FIG. 3B is a magnified view of the pen tip of the stylus 34 and the pen tip side of the inner housing 33, both extended from the outer housing 2. As shown in FIG. 3B, the portion of the stylus 34 other than its pen tip and the ferrite core 32 are stored in the inner housing 33 for protection against external force such as vertical or horizontal impact that may be applied to the pen tip.

As shown in FIG. 3B, what is extended from the opening 2b is a pen tip side portion composed of the stylus guide part 33b and the ferrite storage part 33c of the inner housing 33. This configuration strongly protects such parts as the stylus 34 and the ferrite core 32 that are vulnerable to eternally applied force (external force) when the parts are made thinner. The outer tip of the stylus guide part 33b of the inner housing 33 is tapered as shown in FIGS. 3A and 3B. This enables the electronic pen body section 3 to be extended smoothly and without getting caught by the opening 2b of the outer housing 2.

Because the stylus 34 and the ferrite core 32 do not come into contact with the outer housing 2 as described above, such troubles as destruction or deformation of the stylus 34 or the ferrite core 32 are totally eliminated. As shown in FIG. 3B, the stylus 34 is not in contact with the outer housing 2. The pen tip of the stylus 34 is surrounded by the stylus guide part 33b having a predetermined axial length as indicated in FIGS. 3A and 3B.

That means there is no obstacle to the axial sliding movement of the stylus 34. The stylus guide part 33b acts as a guide (i.e., a position restricting portion) to let the pen tip of the stylus 34 slide axially in an appropriate and smooth manner. The stylus 34 thus axially moves slidingly by responding suitably to the writing pressure applied to the pen tip, so that writing pressure is detected appropriately and precisely.

As shown in FIGS. 3A and 3B, the ferrite storage part 33c is made thin to accommodate the first coil unwound part of the ferrite core 32. The first coil unwound part of the ferrite core 32 arranged inside the ferrite storage part 33c works to suitably restrict the position of the ferrite core 32 in the inner housing 33. This arrangement protects not only the stylus 34 but also the ferrite core 32. Because the ferrite core 32 is positioned closer to the pen tip side, the thinly formed ferrite core 32 is nevertheless brought closer to the sensor to transmit a highly noise-resistant signal thereto.

After using the electronic pen 1, the user again knocks on the end part 42a of the knocking rod 42. As shown in FIG. 1A, the knocking action stores the electronic pen body section 3 as a whole into the hollow part 2a of the outer housing 2. At this point, the entire electronic pen body section 3 is housed in the hollow part 2a and thus protected by the outer housing 2. Obviously, when the electronic pen body section 3 is stored inside the outer housing 2, the stylus 34 and the ferrite core 32 are not in contact with the outer housing 2 and thus will not be damaged or deformed thereby.

(Outline of Coordinate Detecting Sensor Operated by Electromagnetic Resonance Method)

Figure 4:
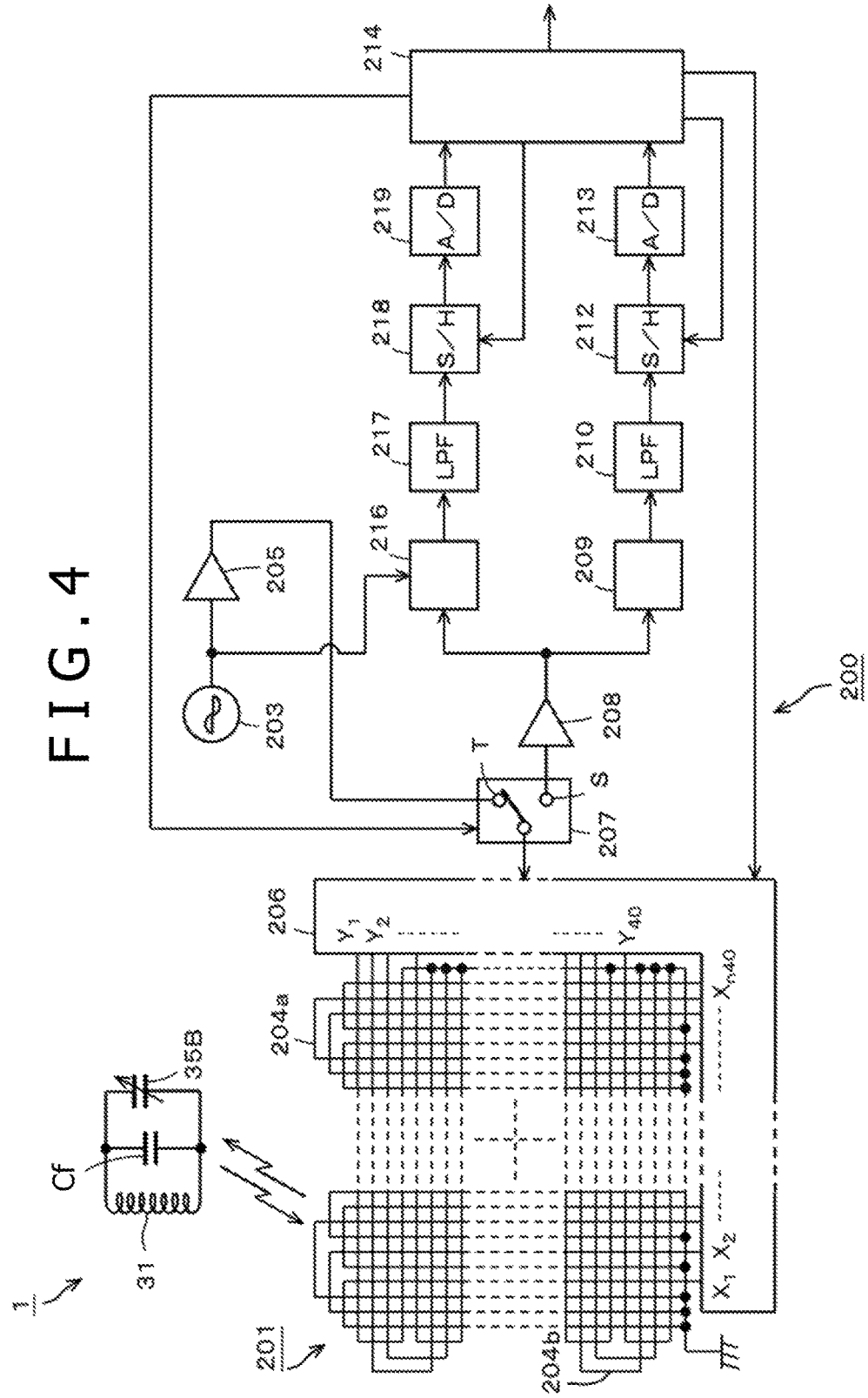
FIG. 4 is a block diagram showing a circuit configuration of a writing instrument according to one or more embodiments of the present disclosure, along with a circuit configuration of a position detecting device for use with the writing instrument.

Described below with reference to FIG. 4 is an example of a circuit configuration in the present embodiment of a position detecting device 200 operated by an electromagnetic resonance method for detecting (sensing) the position indicated by, and the writing pressure exerted to, the electronic pen 1 also operated by the electromagnetic resonance method and discussed above using FIGS. 1A to 3B. FIG. 4 is a block diagram showing examples of circuit configurations of the electronic pen 1 and the position detecting device 200. The electronic pen 1 and the position detecting device 200 constitute an input device.

The circuits of the electronic pen 1 are configured to make up a resonant circuit including the coil 31 for signal exchange, the writing pressure detector 35B connected to the coil 31, and a resonant capacitor Cf connected in parallel with the writing pressure detector 35B.

Meanwhile, the position detecting device 200 has an X-axis direction loop coil group 204a and a Y-axis direction loop coil group 204b stacked therein to form a coordinate detecting sensor 201 operated by the electromagnetic induction method. The loop coil groups 204a and 204b are each composed of 40 rectangular loop coils. The loop coils constituting the loop coil groups 204a and 204b are successively stacked one on top of the other and arranged an equal distance apart.

The position detecting device 200 also has a selection circuit 206 to which the X-axis direction loop coil group 204a and the Y-axis direction loop coil group 204b are connected. The selection circuit 206 successively selects one of the loop coils making up the X-axis direction loop coil group 204a and the Y-axis direction loop coil group 204b.

The position detecting device 200 further includes an oscillator 203, a current driver 205, a connection switching circuit 207, a receiving amplifier 208, a detector 209, a low-pass filter 210, a sample-hold circuit 212, and an analog-to-digital (A/D) conversion circuit 213, a synchronous detector 216, another low-pass filter 217, another sample-hold circuit 218, another A/D conversion circuit 219, and a processing part 214.

The oscillator 203 generates an alternating-current (AC) signal with a frequency f0 and supplies the signal to the current driver 205 and the synchronous detector 216. The current driver 205 converts the AC signal coming from the oscillator 203 into a current before feeding it to the connection switching circuit 207. Under control of the processing part (e.g., processor) 214, to be discussed later, the connection switching circuit 207 switches connection destinations (a transmitting-side terminal T and a receiving-side terminal S) to which the loop coil selected by the selection circuit 206 is connected. Of these connection destinations, the transmitting-side terminal T is connected with the current driver 205, and the receiving-side terminal S is connected with the receiving amplifier 208.

An induced voltage developed on the loop coil selected by the selection circuit 206 is sent to the receiving amplifier 208 via the selection circuit 206 and the connection switching circuit 207. The receiving amplifier 208 amplifies the induced voltage fed from the loop coil, and forwards the amplified voltage to the detector 209 and the synchronous detector 216.

The detector 209 detects the induced voltage developed on the loop coil, i.e., the received signal, and sends it to the low-pass filter 210. The low-pass filter 210 having a cutoff frequency sufficiently lower than the above-mentioned frequency f0 converts the output signal from the detector 209 into a direct-current (DC) signal and forwards it to the sample-hold circuit 212. The sample-and-hold circuit 212 holds a voltage value of the output signal from the low-pass filter 210 at a predetermined timing, specifically at a predetermined point in time during a signal-receiving period, and outputs the voltage value to the A/D conversion circuit 213. The A/D conversion circuit 213 converts the analog output from the sample-hold circuit 212 into a digital signal and outputs the signal to the processing part 214.

Meanwhile, the synchronous detector 216 synchronously detects the output signal from the receiving amplifier 208 using the AC signal from the oscillator 203. The synchronous detector 216 outputs to the low-pass filter 217 a signal of which the level corresponds to the phase difference between the two signals. The low-pass filter 217 having a cutoff frequency sufficiently lower than the frequency f0 converts the output signal from the synchronous detector 216 into a DC signal and forwards the signal to the sample-hold circuit 218. The sample-hold circuit 218 holds a voltage value of the output signal from the low-pass filter 217 at a predetermined timing and outputs the voltage value to the A/D conversion circuit 219. The A/D conversion circuit 219 converts the analog output from the sample-hold circuit 218 into a digital signal and outputs the signal to the processing part 214.

The processing part 214 controls the components of the position detecting device 200. Specifically, the processing part 214 controls the selection of the loop coil by the selection circuit 206, the switching by the connection switching circuit 207, and the timings of the sample-hold circuits 212 and 218. In accordance with the input signals from the A/D conversion circuits 213 and 219, the processing part 214 causes the X-axis direction loop coil group 204a and the Y-axis direction loop coil group 204b to transmit radio waves for a predetermined transmission continuation time.

Each loop coil in the X-axis direction loop coil group 204a and the Y-axis direction loop coil group 204b develops the induced voltage in response to radio waves transmitted from the electronic pen 1. On the basis of the voltage level of the induced voltage developed on each loop coil, the processing part 214 calculates the coordinate values of the position indicated by the electronic pen 1 in X-axis and Y-axis directions. Also, the processing part 214 detects writing pressure based on the phase difference between the transmitted and the received radio waves. In the present embodiment, the electronic pen 1 and the position detecting device 200, both operated by the electromagnetic resonance method, constitute the input device as described above.

(Use of Electronic Pen Body Section in Conjunction with Rotary Type Multifunctional Pen)

Figure 5:
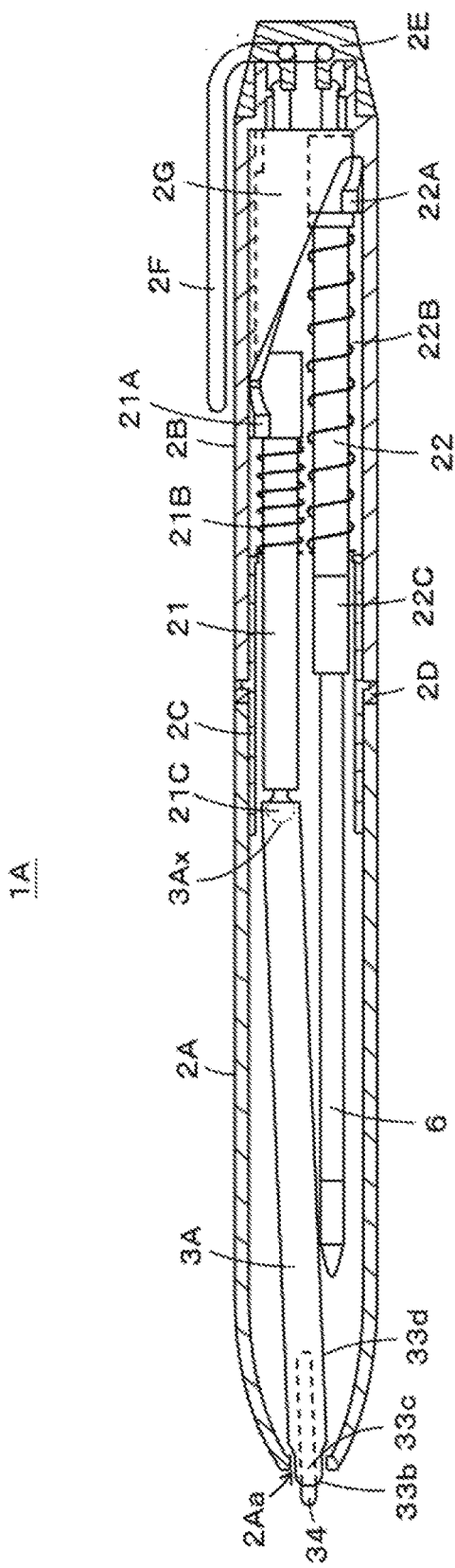
FIG. 5 is a schematic view of an example in which the electronic pen body section is used in a rotary type multi-functional pen.

FIG. 5 shows an appearance and an internal configuration of a multifunctional pen 1A having a rotary type multicolor pen structure that includes an electronic pen body section 3A and an ordinary ballpoint pen cartridge 6, the electronic pen body section 3A being configured substantially the same as the electronic pen body section 3 having the above-described ballpoint pen cartridge type structure. That is, the electronic pen body section 3A is configured similarly to the electronic pen body section 3 with the sole exception of a portion corresponding to the above-mentioned connection member 39 of the electronic pen body section 3.

In the example of FIG. 5, a bisected cross-sectional view is provided showing outer housings 2A and 2B, a joint pipe 2C, a connection part ring 2D, and a rear end cap part 2E. The multifunctional pen 1A indicated in FIG. 5 is configured substantially the same as a commercially available rotary type multicolor ballpoint pen.

That is, the multifunctional pen 1A has two housings: a pen tip-side outer housing 2A, and a rear end-side outer housing 2B. The two outer housings 2A and 2B are joined together by the joint pipe 2C. The connection part ring 2D is positioned at a connection part at which the outer housings 2A and 2B are axially opposed to each other. The connection part ring 2D thus positioned allows the user to clearly distinguish the two outer housings 2A and 2B. When joined together by the joint pipe 2C, the outer housings 2A and 2B are arranged to be axially rotatable in directions different from each other.

The rear end side of the outer housing 2B is closed by the rear end cap part 2E. The rear end cap part 2E is provided with a clip 2F for attaching the multifunctional pen 1A to the user's jacket pocket, for example. At the rear end side of the outer housing 2B is a triangular cam 2G having an outer diameter coinciding with the inner diameter of the outer housing 2B. The triangular cam 2G is formed with a cylindrical member cut obliquely from the top to the bottom. When viewed laterally, the cylindrical member after the cut exhibits a triangular shape as shown in FIG. 5. When the outer housing 2B is rotated, the triangular cam 2G is rotated in linked relation therewith.

Inside the outer housing 2B are push rods 21 and 22 held therein by the joint pipe 2C. At the rear end side of the push rods 21 and 22 (i.e., opposite the pen tip side) are mound-shaped sliding parts 21A and 22A coming into contact with, and moving slidingly on, the outer circumference of the above-mentioned triangular cam 2G. Springs 21B and 22B are disposed around the push rods 21 and 22. As shown in FIG. 5, the springs 21B and 22B are each held between the end part of the joint pipe 2C opposite the pen tip on one hand and the sliding parts 21A and 22A on the other hand. Thus positioned, the springs 21B and 22B work to retract the push rods 21 and 22 from the pen tip side toward the rear end side inside the outer housing 2B.

At the pen tip-side end of the push rod 21 is a spherically protruding part 21C to be interlocked with a spherically recessed part 3Ax at the rear end side of the electronic pen body side 3A. The spherically protruding part 21C of the push rod 21 and the spherically recessed part 3Ax of the electronic pen body section 3A make up what is known as a universal joint. At the pen tip-side end of the push rod 22 is an interlocking part 22C to be interlocked with a rear end-side connection part of the ballpoint pen cartridge 6.

As shown in FIG. 5, the spherically recessed part 3Ax at the rear end side of the electronic pen body section 3A is arranged to be interlocked with the spherically protruding part 21C at the pen tip-side end of the push rod 21. The electronic pen body section 3A is usually not conducive to being bent because it has parts such as a printed board and a board protecting pipe stored therein as mentioned above. However, as shown in FIG. 5, the electronic pen body section 3A is arranged to be bent in all directions freely and easily at the position where the spherically protruding part 21C of the push rod 21 is interlocked with the spherically recessed part 3Ax of the electronic pen body section 3A. Thus even when the inner housing 33 of the electronic pen body section 3A is in contact with the inner wall of the outer housing 2A, the electronic pen body section 3A is extended and retracted inside the outer housings 2A and 2B without being subjected to a load large enough to bend the electronic pen body section. That is, the electronic pen body section 3A is moved obliquely toward an opening 2Aa of the multifunctional pen 1A and extended therefrom.

Also, as shown in FIG. 5, a connection member at the rear end side of the ballpoint cartridge 6 is arranged to be interlocked with the interlocking part 22C at the pen tip side of the push rod 22. As is well known, the ballpoint pen cartridge 6 is typically made of a plastic excluding the pen tip part and is flexible enough to be bent to a certain extent in all directions without being broken. Thus inside the outer housings 2A and 2B, the ballpoint pen cartridge 6 comes into contact with the inner wall of the outer housing 2A but can be extended and retracted without being burdened by such contact. Obviously, if a metallic ballpoint pen cartridge is used, a universal joint may be adopted in the same manner as the connection part of the electronic pen body section 3A.

The outer housing 2A is thus joined via the joint pipe 2C to the outer housing 2B furnished with the electronic pen body section 3A and the ballpoint pen cartridge 6. In this manner, the multifunctional pen 1A is configured as a writing instrument that stores the electronic pen body section 3A and ballpoint pen cartridge 6 in its outer housings 2A and 2B as shown in FIG. 5.

With the multifunctional pen 1A configured as described above, axially turning the outer housing 2B relative to the outer housing 2A rotates the triangular cam 2G inside the outer housing 2B. This causes the sliding parts 21A and 22A at the rear end side of the push rods 21 and 22 to move slidingly on the outer circumference of the triangular cam 2G.

The rotation of the triangular cam 2G moves one of the push rods 21 and 22 toward the tip side of the triangular cam 2G (i.e., pen tip side of the multifunctional pen 1A). One of the push rods 21 and 22 is thus pushed toward the opening 2Aa of the outer housing 2A and extended therefrom. At the same time, the other push rod 21 or 22 is moved toward the bottom side of the triangular cam 2G (i.e., rear end side of the multifunctional pen 1A opposite the pen tip side). The other push rod 21 or 22 is thus retracted by the spring 21B or 22B toward the rear end side of the multifunctional pen 1A and stored into the outer housings 2A and 2B.

What is shown in the example of FIG. 5 is that the push rod 21 is positioned at the pen tip-side end of the triangular cam 2G and pushed by the triangular cam 2G, causing the pen tip-side part of the electronic pen body section 3A to be extended from the opening at the tip of the outer housing 2A. Thus in the example of FIG. 5, the push rod 22 is positioned at the rear end side of the triangular cam 2G and retracted by the spring 22B, allowing the entire ballpoint pen cartridge 6 to be stored into the outer housings 2A and 2B.

Also in the example of FIG. 5, the electronic pen body section 3A is configured similarly to the configuration of the electronic pen body section 3 of the present embodiment in FIGS. 3A and 3B except that the spherically recessed part 3Ax is disposed at the rear end side. The coil 31 wound around the ferrite core 32 of the electronic pen body section 3A and the capacitors on the printed board 36 make up a resonant circuit. This resonant circuit is coupled with the sensor of the position detecting device by electromagnetic induction to permit signal exchange therebetween.

Consider the case where the electronic pen body section 3A or the ballpoint pen cartridge 6 is moved toward the pen tip opening 2Aa of the outer housing 2A by the triangular cam 2G being turned as a result of axial rotation of the outer housing 2B. In this case, as shown in FIG. 5, the electronic pen body section 3A is moved effortlessly toward the opening 2Aa thanks to the universal joint formed by the spherically protruding part 21C of the push rod 21 and by the spherically recessed part 3Ax at the rear end of the electronic pen body section 3A. Obviously, the ballpoint pen cartridge 6 with its flexibility is also moved effortlessly toward the opening 2Aa.

However, because the electronic pen body section 3A or the ballpoint pen cartridge 6 is moved obliquely toward the opening 2Aa, each of their pen tip parts is likely to come into contact with the outer housing 2A. Still, in the case of the multifunctional pen 1A shown in FIG. 5, as with the electronic pen 1 as the writing instrument of the above-described embodiment, the ferrite core 32 and the stylus 34 of the electronic pen body section 3A excluding the pen tip part are protected by the inner housing 33 when pushed out of the opening 2Aa of the outer housing 2A. In this case, the stylus 34 and the ferrite core 32 do not come into contact with the surroundings of the opening 2Aa of the outer housing 2A.

Where the electronic pen body section 3A, configured substantially the same as the electronic pen body section 3 of the above-described embodiment, is used in conjunction with the rotary type multifunctional pen 1A shown in FIG. 5, the stylus 34 and the ferrite core 32 are protected by the inner housing 33 against damage or deformation. Because the stylus 34 is not in contact with the surroundings of the opening 2Aa of the outer housing 2A, the surroundings of the opening 2Aa do not hamper the sliding movement of the stylus 34 and let the writing pressure be detected appropriately. In the case of the ballpoint pen cartridge 6, the pen tip part 61 is traditionally formed to be sturdy and is unlikely to be damaged or deformed by the contact with the outer housing 2A.

(Use of Electronic Pen Body Section in Conjunction with Knock Type Multifunctional Pen)

FIGS. 6A and 6B are schematic views showing appearances of the electronic pen body section 3 having the ballpoint pen cartridge structure of the above-described embodiment and a knock type multifunctional pen 1B configured using ordinary ballpoint pen cartridges. In the example of FIGS. 6A and 6B, the outer housing 2B of the multifunctional pen 1B is made of a transparent synthetic resin through which the inside of the outer housing 2B can be seen.

The outer housing 2B of the multifunctional pen 1B is configured to be approximately the same as the housing of a commercially available multicolor ballpoint pen with a knock mechanism. The housing and the knock mechanism of the commercially available multicolor ballpoint pen can be used unmodified. Inside the outer housing 2B of this ballpoint pen are the electronic pen body section 3 of the above embodiment, a black ink ballpoint pen cartridge 3Bk, and a red ink ballpoint pen cartridge 3Rd. The electronic pen body section 3 is shaped to be the same as shown in FIGS. 2B, 3A, and 3B. The ballpoint pen cartridges 3Bk and 3Rd are each shaped to be the same as shown in FIG. 2A.

The knock mechanism of the multifunctional pen 1B includes a knocking rod 42E interlocked with the electronic pen body section 3, a knocking rod 42Bk interlocked with the black ink ballpoint pen cartridge 3Bk, and a knocking rod 42Rd interlocked with the red ink ballpoint pen cartridge 3Rd. Moving the knocking rod 42E slidingly toward the pen tip side causes the pen tip part of the inner housing 33 made of the stylus guide part 33b and the ferrite storage part 33c to be extended from the outer housing 2B. This in turn allows the resonant circuit made of the coil 31 wound around the ferrite core 32 and of the capacitors to be coupled with the sensor of the position detecting device by electromagnetic induction for signal exchange therebetween.

Also, moving the knocking rod 42Bk slidingly toward the pen tip side causes the pen tip part 61 of the ballpoint pen cartridge 3Bk to be extended to permit writing in black ink. Likewise, moving the knocking rod 42Rd slidingly toward the pen tip side causes the pen tip part 61 of the ballpoint pen cartridge 3Rd to be extended to permit writing in red ink.

In the case of the multifunctional pen 1B shown in FIGS. 6A and 6B, the electronic pen body section 3 and the ballpoint pen cartridges 3Bk and 3Rd are stored in the outer housing 2B. The electronic pen body section 3 and the ballpoint pen cartridges 3Bk and 3Rd are arranged concentrically around the axial center of the multifunctional pen 1B inside the outer housing 2B.

In this arrangement, the electronic pen body section 3 and the ballpoint pen cartridges 3Bk and 3Rd are each moved obliquely toward an opening 2Ba inside the outer housing 2B in response to the knocking rod 42E, 42Bk, or 42Rd being moved slidingly. As a result, the electronic pen body section 3 and the ballpoint pen cartridges 3Bk and 3Rd are each likely to have the pen tip coming into contact with the outer housing 2B.

However, with the multifunctional pen 1B shown in FIGS. 6A and 6B, as in the case of the electronic pen 1 as the writing instrument of the above-described embodiment, the stylus 34 and the ferrite core 32 of the electronic pen body section 3 protected by the inner housing 33 are moved without getting caught by the surroundings of the opening 2Ba of the outer housing 2B and are extended from the outer housing 2B. Thus when the electronic pen body section 3 of the above embodiment is used in conjunction with the knock type multifunctional pen 1B of which the configuration is shown in FIGS. 6A and 6B, the stylus 34 and the ferrite core 32 are protected by the inner housing 33 against damage or deformation. Furthermore, with no contact between the stylus 34 and the surroundings of the opening 2Ba of the outer housing 2B, the surroundings of the opening 2Ba of the outer housing 2B do not hamper the sliding movement of the stylus 34 and let writing pressure be detected appropriately.

In this manner, the electronic pen body section 3 of the above-described embodiment is installed as one of the ballpoint pen cartridges in a commercially available knock type multicolor ballpoint pen. The electronic pen function is thus added to the multicolor ballpoint pen.

In the case of the knock type multifunctional pen 1B shown in FIGS. 6A and 6B, the universal joint may also be configured to connect the electronic pen body section 3 with the corresponding push rods. This configuration allows the electronic pen body section 3 to move obliquely toward the opening 2Ba without being inordinately burdened.

(Use of Electronic Pen Body Section in Conjunction with Capacitive Coupling Type Pen)

It was explained above that the electronic pen body sections 3 and 3A of the above-described embodiments are each operated by the electromagnetic induction method. Alternatively, the present disclosure may also be applied to a capacitive coupling type electronic pen (called the capacitive type electronic pen hereunder).

Figure 7:
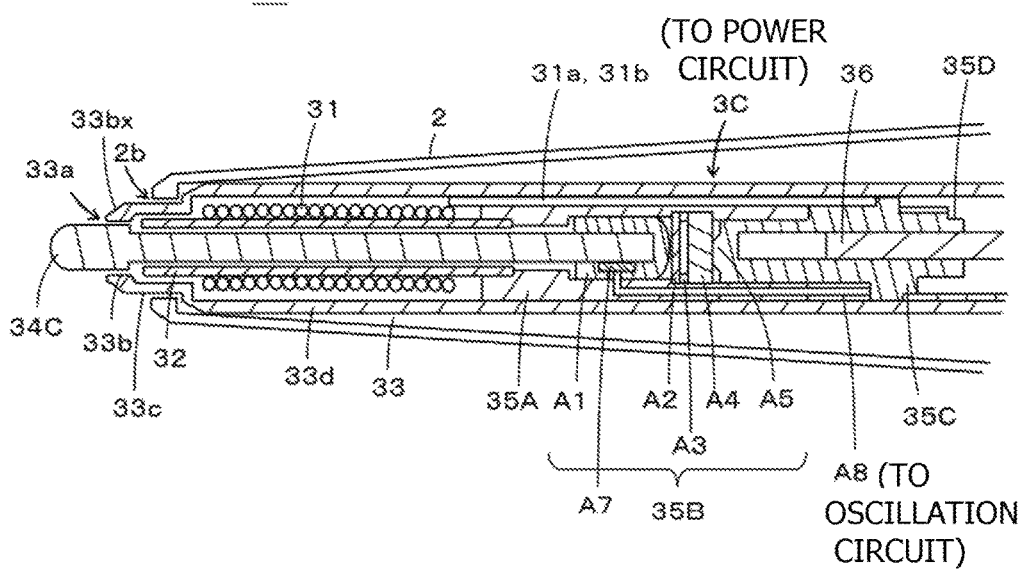
FIG. 7 is a schematic view of an a capacitive type electronic pen according to one or more embodiments of the present disclosure.
Figure 8:
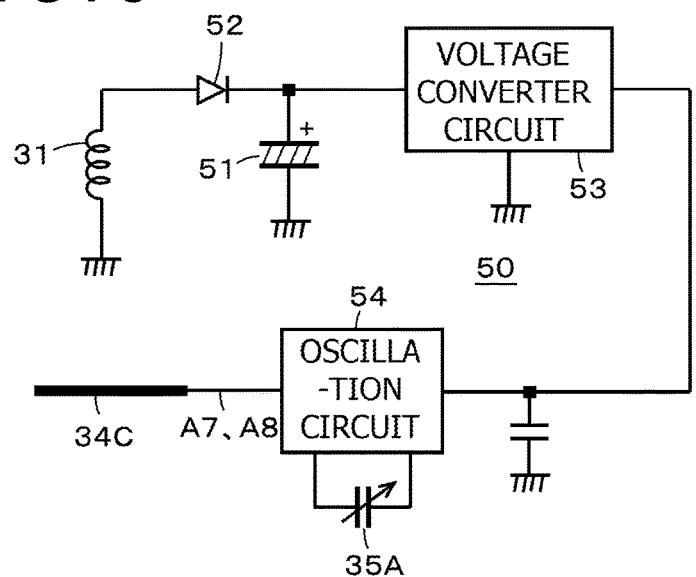
FIG. 8 is a circuit diagram of an example circuit configuration of the electronic pen shown in FIG. 7.

FIG. 7 is a schematic view of a capacitive type electronic pen 1C according to one or more embodiments of the present disclosure. FIG. 8 is a circuit diagram showing a circuit configuration of the electronic pen 1C shown in FIG. 7. In FIGS. 7 and 8, the same reference symbols designate the same parts. Of the parts constituting the electronic pen 1C shown in FIGS. 7 and 8, those also found in the electronic pen 1 and the electronic pen body section 3 of the embodiment discussed above in reference to FIGS. 3A and 3B are given the same reference symbols and will not be described further in detail.

As shown in FIG. 7, the electronic pen 1C of this example is basically configured the same as the electromagnetic induction type electronic pen 1 of the above-described embodiment. However, in the case of the capacitive type electronic pen, its stylus 34C is made electrically conductive to transmit signals therethrough to the position detecting device. Specifically, the stylus 34C is formed by a synthetic resin mixed with a metal and a carbon material, for example.

In this example, as shown in FIG. 7, the stylus holding part A1 has an electrode A7 disposed therein to make contact with the stylus 34C being pushed. A lead wire A8 is extended from the electrode A7 and connected to an oscillation circuit mounted on the printed board 36. The connection allows the signal from the oscillation circuit on the printed board 36 to be transmitted to the position detecting device via the stylus 34C. Alternatively, the stylus holding part A1 may be formed by a conductive material such as a resin mixed with conductive rubber and carbon. When made electrically conductive, the stylus holding part A1 may be connected with the oscillation circuit using a conductive line.

With the electronic pen 1C of this example, the coil 31 wound around the ferrite core 32 is connected not to the capacitors constituting the oscillation circuit but to a power circuit mounted on the printed board 36. This allows the coil 31 to be used as a power supply terminal receiving the supply of power from the outside, so that a wireless power charging function is implemented.

Also in this example, an electronic pen body section 3C is configured with the coil 31, the ferrite core 32, the stylus 34C, the mold part 35A, the writing pressure detector 35B, the interlocking part 35C, the connection terminal part 35D, the electrode A7, the lead wire A8, the printed board 36, the board protecting pipe 37, the pipe cap 38 not shown, and the connection member 39, all stored in the inner housing 33.

The electronic pen body section 3C configured as described above is stored in the outer housing 2 structured like its counterpart in the electronic pen 1 of the above-described embodiment, thereby constituting the electronic pen 1C. In the case of the electronic pen body section 3C for use with the electronic pen 1C of this example, the printed board 36 is mounted with parts including the power circuit for powering the oscillation circuit and the coil 31 as discussed above.

The circuit configuration of the electronic pen 1C of this example is shown in FIG. 8. In FIG. 8, reference numeral 51 stands for an electric double layer capacitor, 52 for a rectifier diode, 53 for a voltage converter circuit, and 54 for an oscillation circuit constituting a signal oscillation circuit of this example. As shown in FIG. 8, one end of the coil 31 is connected to the anode of the diode 52 and the other end is grounded (GND). Also, one end of the electric double layer capacitor 51 is connected to the cathode of the diode 52 and the other end is grounded.

The stylus 34C constituting an electrode core is electrically connected to the oscillation circuit 54. As in the case of the electronic pen body section 3 described above using FIGS. 3A and 3B, the writing pressure detector 35B in the electronic pen body section 3C is electrically connected to the oscillation circuit 54.

The oscillation circuit 54 generates a signal of which the frequency varies with the capacitance of the variable capacitance capacitor in the writing pressure detector 35B. The oscillation circuit 54 supplies the signal thus generated to the stylus 34C. The signal from the oscillation circuit 54 is radiated as an electric field of the signal from the tip part of the stylus 34C. The oscillation circuit 54 is typically constituted by an inductance-capacitance (LC) oscillation circuit that utilizes the oscillation generated by a coil and a capacitor. The position detecting device detecting the coordinate position designated by the electronic pen body section 3C of the present embodiment is capable of obtaining the writing pressure applied to the stylus 34C on the basis of the frequency of the signal.

The voltage converter circuit 53 converts the voltage accumulated in the electric double layer capacitor 51 into a constant voltage and feeds the converted voltage to the oscillation circuit 54 as its power. When the capacitive type electronic pen 1C of this example is placed on a charger, not shown, an alternating magnetic field generated by the charger causes the coil 31 to generate induced electromotive force, thereby charging the electric double layer capacitor 51 via the diode 52.

As described above, the capacitive type electronic pen 1C of this example transmits the signal from the oscillation circuit 54 via the stylus 34C to designate the position to the position detecting device. As explained above using FIG. 3A, the inner housing 33 of the electronic pen body section 3C of this example is also made up of the stylus guide part 33b having a tapered outer tip part 33bx, the ferrite storage part 33c, and the body storage part 33d. The electronic pen body section 3C is arranged to be stored in the inner housing 33 that in turn is stored in the outer housing 2, which constitutes the electronic pen 1C.

In the case of the capacitive type electronic pen 1C configured as described above, pushing the knock mechanism disposed in the outer housing 2 also causes the pen tip part of the electronic pen body section 3C to be extended from the opening 2b of the outer housing tip to be ready for use, as explained above using FIGS. 1A and 1B. As shown in FIG. 7, the pen tip of the stylus 34C and the ferrite core 32 in the electronic pen body section 3C of the electronic pen 1C are also protected by the inner housing 33 in a manner averting contact with the surroundings of the opening 2b of the outer housing 2. Because the tip part of the stylus 34C and the ferrite core 32 of the electronic pen 1C are thus kept from contact with the surroundings of the opening 2b of the outer housing 2, these parts are protected against damage or deformation.

Also as shown in FIG. 7, when the pen tip side of the electronic pen body section 3C is extended from the opening 2b of the outer housing 2, the stylus 34C is not in contact with the outer housing 2. For this reason, the stylus 34C axially slides smoothly in keeping with the writing pressure applied to the pen tip, so that the writing pressure is detected suitably and precisely. As with the electronic pen body sections 3 and 3A of the above-described embodiments, the stylus guide part 33b disposed in the inner housing 33 supports the stylus 34C in its axial sliding movement and contributes to detecting the writing pressure appropriately.
(Circuit Configuration of Capacitive Type Position Detecting Device for Detecting Position and Writing Pressure)

Figure 9:
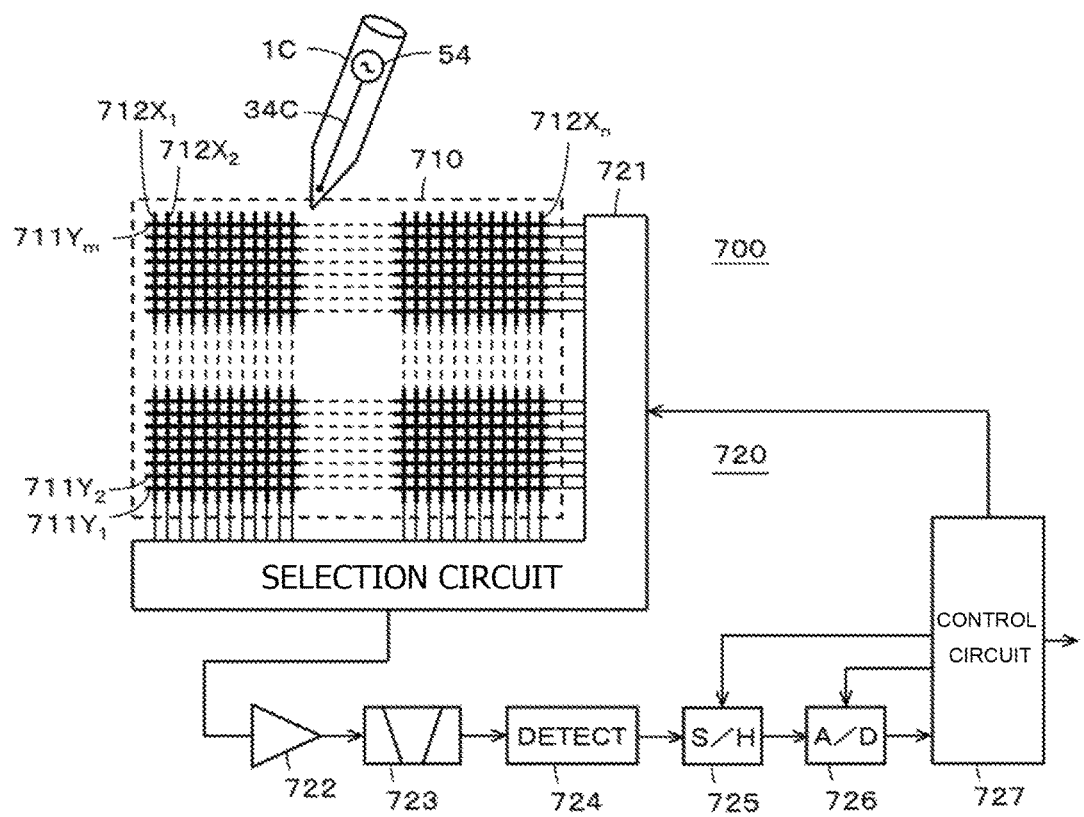
FIG. 9 is a block diagram of an example configuration of a position detecting device operated by a capacitive method.

FIG. 9 is a block diagram of a position detecting device 700 that receives the signal from the capacitive type electronic pen 1C described above using FIGS. 7 and 8 so as to detect the position on the sensor while detecting writing pressure at the same time.

As shown in FIG. 9, the position detecting device 700 of the present embodiment is made up of a sensor 710 and a pen detecting circuit 720 connected to the sensor 710. The sensor 710 is formed with a first conductor group 711 and a second conductor group 712 stacked on top of the other. The first conductor group 711 has multiple first conductors extended in a crosswise direction (X-axis direction) and arrayed in parallel and a predetermined distance apart in a Y-axis direction, for example.

The second conductor group 712 has multiple second conductors extended in a direction intersecting the first conductors, i.e., in a longitudinal direction (Y-axis direction) perpendicular to the first conductors in this example, and arrayed in parallel and a predetermined distance apart in the X-axis direction.

As described above, the sensor 710 of the position detecting device 700 is configured to have a sensor pattern formed by getting the first conductor group 711 and the second conductor group 712 intersecting with each other. Using this sensor pattern, the sensor 710 detects the position designated by the capacitive type electronic pen body section 3C.

The pen detecting circuit 720 includes a selection circuit 721 acting as an input/output interface with the sensor 710, an amplification circuit 722, a band-pass filter 723, a detector circuit 724, a sample-hold circuit 725, an A/D conversion circuit 726, and a control circuit 727.

In accordance with a control signal from the control circuit 727, the selection circuit 721 selects one conductor 711Y or 712X from the first conductor group 711 or the second conductor group 712. The conductor selected by the selection circuit 721 is connected to the amplification circuit 722. The signal from the capacitive type electronic pen body section 3C is detected by the selected conductor and amplified by the amplification circuit 722. The output of the amplification circuit 722 is fed to the band-pass filter 723. The band-pass filter 723 extracts only the frequency component of the signal sent from the capacitive type electronic pen body section 3C.

The output signal from the band-pass filter 723 is detected by the detector circuit 724. The output signal from the detector circuit 724 is supplied to the sample-hold circuit 725. Using a sampling signal from the control circuit 727, the sample-hold circuit 725 samples and holds the output signal from the detector circuit 724 at a predetermined timing. The output of the sample-hold circuit 725 is converted to a digital signal by the A/D conversion circuit 726. The digital data from the A/D conversion circuit 726 is read and processed by the control circuit 727.

In accordance with a program stored in an internal read-only memory (ROM), the control circuit 727 works to output control signals to the sample-and-hold circuit 725, the A/D conversion circuit 726, and the selection circuit 721. Using the digital data from the A/D conversion circuit 726, the control circuit 727 calculates the coordinates of the position on the sensor 710 designated by the capacitive type electronic pen 1C and obtains the writing pressure detected by the writing pressure detector 35B.

As described above, the capacitive type electronic pen body section 3C is configured to be stored in the inner housing 33 to improve the strength of the pen tip part while allowing the stylus 34C under writing pressure to suitably move slidingly so that the writing pressure may be detected appropriately. This electronic pen body section 3C is stored in the outer housing 2 to make up the capacitive type electronic pen 1C.

The electronic pen 1C explained above using FIGS. 7 and 8 is an example of the monofunctional knock type electronic pen described earlier with reference to FIGS. 1A and 1B. Obviously, the rotary type multifunctional pen described above in reference to FIG. 5 or the knock type multifunctional pen explained above by referring to FIGS. 6A and 6B is also implemented using the capacitive type electronic pen body section 3C depicted above with reference to FIG. 7.

The rear end side of the electronic pen body section 3C, when used to implement the rotary type multifunctional pen described above using FIG. 5, needs to have an interlocking part to be interlocked with the spherically protruding part 21C.

(Variations of Electronic Pen Body Section)

Figure 10A:
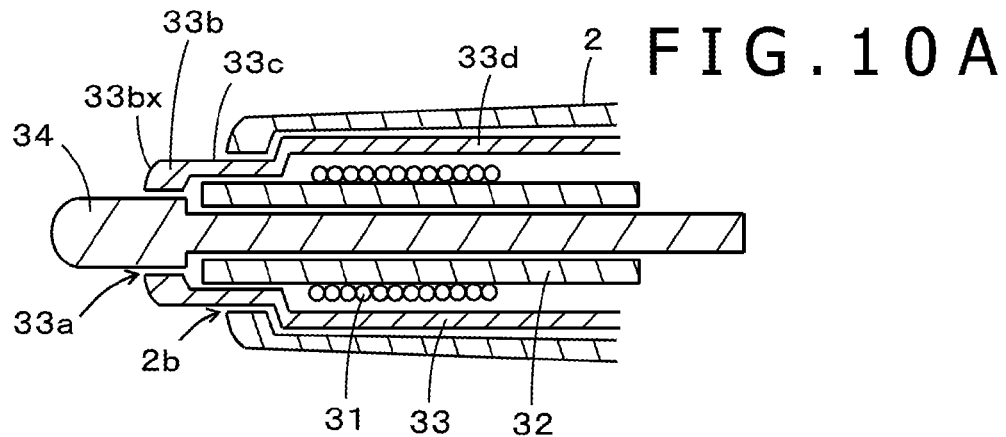
FIGS. 10A, 10B, and 10C are schematic views of variations of the writing instrument according to one or more embodiments of the present disclosure.
Figure 10B:
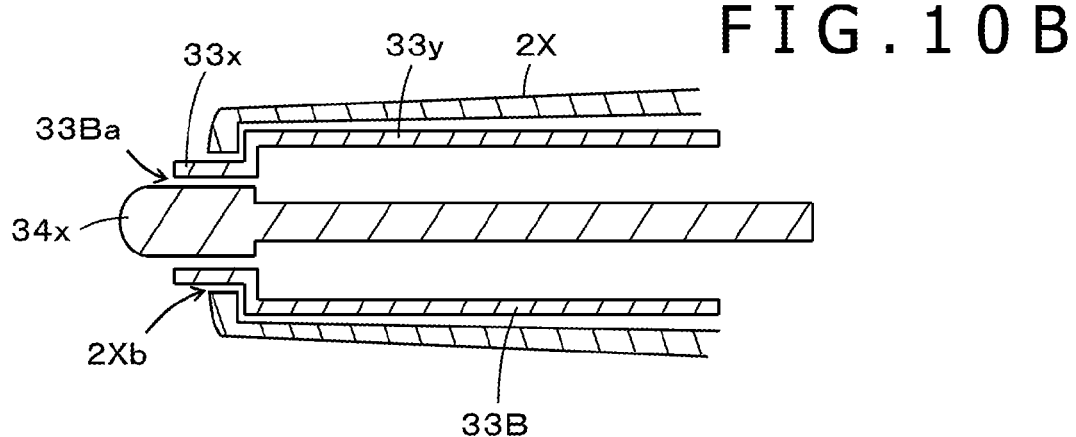
Figure 10C:
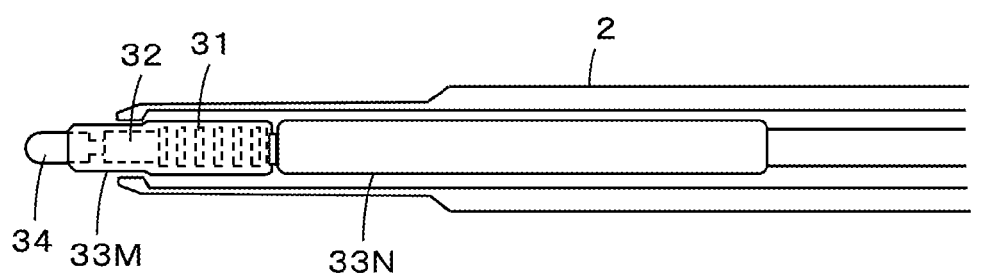

FIGS. 10A, 10B, and 10C are examples of variations of a writing instrument according to the present disclosure. These drawings are cross-sectional views each showing the pen tip part of the electronic pen body section. It was explained above that the electronic pen body sections 3, 3A, and 3C of the above embodiments each have the coil 31 wound around the ferrite core 32 to make up the resonant circuit or the power supply terminal for receiving the supply of power. This requires the ferrite core 32 to be formed thinner to allow for the windings of the coil 31, as shown in FIG. 10A.

To suitably protect the pen tip part formed with the stylus 34 inserted through the ferrite core 32 wound with the coil 31, the inner housing 33 includes the stylus guide part 33*b* with a tapered outer tip part 33*bx*, the ferrite storage part 33*c*, and the body storage part 33*d*, as shown in FIG. 10A. This configuration suitably protects the stylus 34 and the pen tip-side part of the ferrite core 32 and positions the ferrite core 32 in the inner housing 33 on the pen tip side, i.e., closer to the sensor, so as to ensure higher resistance to noise.

The presence of the stylus guide part 33*b* protects the pen tip of the stylus 34 and allows the pen tip part of the stylus 34 to be extended and retracted smoothly and appropriately through an opening 33*a* at the tip of the inner housing 33. Also, the presence of the ferrite storage part 33*c* enables the ferrite core 32 to be positioned closer to the pen tip side. When the pen tip side of the electronic pen body section is extended from the opening 2*b* of the outer housing 2, the ferrite core 32 is not in direct contact with the outer housing 2. This arrangement protects the thinly formed ferrite core 32 appropriately.

When a capacitive type electronic pen is configured, it has no need to include the ferrite core and coil if power is available internally. In this case, as shown in FIG. 10B, a stylus 34*x* may be stored in an inner housing 33B made of a stylus guide part 33*x* and a body storage part 33*y*. Preferably, a shield may be disposed around the stylus 34*x* in the inner housing 33B to protect the stylus 34*x* and prevent noise from intruding on the stylus 34*x* from the outside.

In that case, too, the portion of the stylus 34*x* excluding the pen tip may be stored in the inner housing 33B. This suitably protects the stylus 34*x* when the pen tip side of the electronic pen body section is extended from an opening 2X*b* of an outer housing 2X. The stylus guide part 33*x* supports the stylus 34*x* in getting axially extended and retracted slidingly through the opening 33Ba of the inner housing 33B. The body storage part 33*y* further protects the writing pressure detector and the printed circuit.

With the above-described embodiments, it was explained that the inner housing 33 stores all parts for implementing the electronic pen function of the electronic pen body section. Alternatively, as shown in FIG. 10C, an inner housing 33M may be used to store only a certain portion of the stylus side of the electronic pen body section consisting of the coil 31, the ferrite core 32, and the stylus 34. In this case, another portion including the writing pressure detector and the printed board may be stored in, and protected by, another inner housing 33N. As another alternative, the other inner housing 33N may be omitted. The inner housing need only be configured in a manner protecting at least the ferrite core 32 and the portion of the stylus 34 in the electronic pen body section excluding the pen tip part.

Advantages of Embodiments

Where the writing instrument is configured using the electronic pen body section as thin as the ballpoint pen cartridge (i.e., refill), the inventive configuration suitably reinforces the portion of low mechanical strength including the stylus and ferrite core on the pen tip side of the electronic pen body section. In particular, where a multifunctional pen is configured, the pen tip part of the electronic pen body section is protected appropriately when the electronic pen body section is moved in the outer housing obliquely toward its opening.

The stylus moved slidingly in keeping with writing pressure is protected against troubles such as interference with the outer housing that impedes the sliding movement. This provides a writing instrument that offers the electronic pen function, is not prone to failure, works with high precision, and is easy to use.

(Variations)

The thicknesses and the lengths of the stylus, the ferrite core, and other parts may be varied as needed depending on the electronic pen function to be implemented. The number of windings around the coil and the size of the ferrite core wound with the coil may also be adjusted as needed.

Described above as the embodiments of the present disclosure are the multifunctional pen (FIG. 5) having the electronic pen function and the ballpoint pen function, and the multifunctional pen (FIGS. 6A and 6B) having the electronic pen function and the two-color ballpoint pen function. Alternatively, the disclosure can be applied to diverse types of multifunctional pens having two or more functions.

For example, there may be provided a multifunctional pen that incorporates an electronic pen body section operated by the electromagnetic induction method and another electronic pen body section operated by the capacitive coupling method. Obviously, a multifunctional pen may also be provided to include multiple electronic pen body sections operated by the electromagnetic induction method. A multifunctional pen may be further provided to have multiple electronic pen body sections operated by the capacitive coupling method. It is thus possible to provide a writing instrument including at least one electronic pen body section, or a multifunctional pen (writing instrument) having at least one electronic pen body section and at least one writing function other than the electronic pen body section.

All writing instruments discussed above in connection with the embodiments have the extending mechanism for extending the electronic pen body section or the ballpoint pen cartridge. Alternatively, a writing instrument may be configured to have the stylus pen tip and the pen tip-side part of the inner housing extended from the opening at one end of the outer housing, as with ordinary ballpoint pens without the extending mechanism. The pen tip side of the inner housing includes at least the stylus guide part. If the ferrite storage part is to be provided, that part may be included in the pen tip side of the inner housing.

It was explained above that the outer tip part 33*bx* of the stylus guide part 33*b* is tapered. Alternatively, the outer tip part 33*bx* of the stylus guide part 33*b* need not to be tapered.

As described above with reference to FIGS. 10A, 10B, and 10C, the present disclosure may be implemented by varying the configuration of the inner housing including the shapes of the stylus and the ferrite core and the presence or absence of the coil wound around the ferrite core. The point is that the inner housing is configured to cover the thinly formed pen tip side of possible low mechanical strength constituted by the stylus other than its pen tip and by the ferrite core, thus protecting the pen tip against external force such as vertical or horizontal impact that may be applied to the pen tip.

It is to be noted that the embodiment of the present disclosure is not limited to the foregoing embodiments, and that various changes can be made without departing from the spirit of the present disclosure.

What is claimed is:

1. A writing instrument comprising:
    a cylindrical outer housing, a first end of the outer housing having an outer opening; and
    an electronic pen body stored in the outer housing,
    wherein the electronic pen body includes:
        a stylus, a first end of the stylus in an axial direction of the stylus serving as a pen tip;
        a cylindrical inner housing storing the stylus, the first end of the stylus serving as the pen tip extending from an inner opening at a distal end of the inner housing, the inner opening of the inner housing defining one axial end of a hole extending axially forming a stylus guide that enables the stylus to move axially;
        a magnetic core disposed around at least part of the stylus;
        a coil wound around the magnetic core; and
        a capacitor connected to the coil,
    wherein, in operation, the pen tip of the stylus and a distal portion of the inner housing having the inner opening extend from the outer opening of the outer housing, and
    wherein the distal portion of the inner housing includes a magnetic core storage area in which part of the magnetic core is stored.

2. The writing instrument according to claim 1,
    wherein, on a second end of the stylus opposite the first end of the stylus serving as the pen tip is a writing pressure detector which, in operation, is pushed in by the stylus while the stylus is moved toward the writing pressure detector.

3. The writing instrument according to claim 1,
    wherein the stylus guide of the inner housing is externally tapered.

4. The writing instrument according to claim 1,
    wherein a proximal end of the inner housing has a connector that connects the electronic pen body to the outer housing.

5. The writing instrument according to claim 1,
    wherein the coil and the capacitor form a resonant circuit which, in operation, indicates a position of the stylus based on electromagnetic induction.

6. The writing instrument according to claim 1,
    wherein the stylus of the electronic pen body is formed from an electrically conducting material, and
    wherein the electronic pen body includes an oscillation circuit connected electrically to the stylus, the oscillation circuit, in operation, indicating a position of the stylus based on capacitive coupling.

7. The writing instrument according to claim 6,
    wherein the electronic pen body includes:
        a power circuit connected to the coil.

8. The writing instrument according to claim 1,
    wherein the outer housing includes an extending mechanism which, in operation, extends the pen tip of the stylus of the electronic pen body and the distal portion of the inner housing from the outer opening of the outer housing.

9. The writing instrument according to claim 1,
    wherein the outer housing stores a plurality of the electronic pen bodies, and
    the outer housing includes an extending mechanism which, in operation, extends the pen tip of the stylus of one of the electronic pen bodies and the distal portion of the inner housing from the outer opening of the outer housing.

10. The writing instrument according to claim 9,
    wherein at least one of the electronic pen bodies indicate a position of the stylus based on electromagnetic induction or capacitive coupling.

11. The writing instrument according to claim 9,
    wherein a proximal end of the inner housing has a connector that connects the electronic pen body to the outer housing.

12. The writing instrument according to claim 11,
    wherein the connector includes a universal joint.

13. The writing instrument according to claim 1,
    wherein the outer housing stores at least one writing instrument cartridge, and
    the outer housing includes an extending mechanism which, in operation, extends either the pen tip of the stylus of the electronic pen body and the distal portion of the inner housing, or a pen tip of the at least one writing instrument cartridge, from the outer opening of the outer housing.

14. The writing instrument according to claim 13,
    wherein the at least one writing instrument cartridge includes a mechanical pencil cartridge or a ballpoint pen cartridge.

15. An electronic pen body comprising:
    a stylus, a first end of the stylus in an axial direction of the stylus serving as a pen tip;
    a cylindrical inner housing that stores the stylus, the first end of the stylus serving as the pen tip extending from an inner opening at a distal end of the inner housing, the inner opening of the inner housing defining one axial end of a hole extending axially forming a stylus guide that enables the stylus to move axially;
    a magnetic core disposed around at least part of the stylus;
    a coil wound around the magnetic core; and
    a capacitor connected to the coil,
    wherein the pen tip of the stylus and a distal portion of the inner housing having the inner opening are stored in a cylindrical outer housing of an electronic pen and are extendable axially from an outer opening of the outer housing at one axial end thereof, and
    wherein the distal portion of the inner housing includes a magnetic core storage area in which part of the magnetic core is stored.

16. The electronic pen body according to claim 15,
    wherein, on a second end of the stylus opposite the first end of the stylus serving as the pen tip is a writing pressure detector which, in operation, is pushed by the stylus while the stylus is moved toward writing pressure detector.

17. The electronic pen body according to claim 16,
    wherein the stylus guide of the inner housing is externally tapered.

18. The electronic pen body according to claim 15,
    wherein the coil and the capacitor form a resonant circuit which, in operation, indicates a position of the stylus based on electromagnetic induction.

19. The electronic pen body according to claim 15,
wherein the stylus is formed from an electrically conducting material,
the electronic pen body further includes an oscillation circuit connected electrically to the stylus which, in operation, indicates a position of the stylus based on capacitive coupling.

* * * * *